United States Patent
Hubbard, deceased

[15] 3,696,660
[45] Oct. 10, 1972

[54] LOCATING HOLES IN TUBING

[72] Inventor: Glenn O. Hubbard, deceased, late of Andrews, Tex. Claudia M. Hubbard, executrix

[22] Filed: March 2, 1970

[21] Appl. No.: 15,572

[52] U.S. Cl. ............................................. 73/40.5 R
[51] Int. Cl. ............................................. G01m 3/02
[58] Field of Search ..... 73/40.5 R, 40.5 A, 49.1, 49.5

[56] References Cited

UNITED STATES PATENTS

| | | | |
|---|---|---|---|
| 1,736,117 | 11/1929 | Granger | 73/40.5 R |
| 2,545,102 | 3/1951 | Miller | 73/40.5 R |

*Primary Examiner*—Louis R. Prince
*Assistant Examiner*—William A. Henry, II
*Attorney*—Charles W. Coffee

[57] ABSTRACT

Leaks in underground conduit, such as vertical drill pipe in wells or underground pipelines, are located by closing one end of a segment of the conduit and then pumping a plug into the pipeline. As long as fluid is escaping from the conduit through the leak, the plug will move, but when the plug passes the leak, the plug will no longer move because of the fluid trapped between the plug and the closure. Then the plug can be located by a wire line attached to the plug. If the plug is to be retrieved by pulling the plug, a passageway through the plug is opened to prevent swabbing the conduit when retrieving the plug.

6 Claims, 6 Drawing Figures

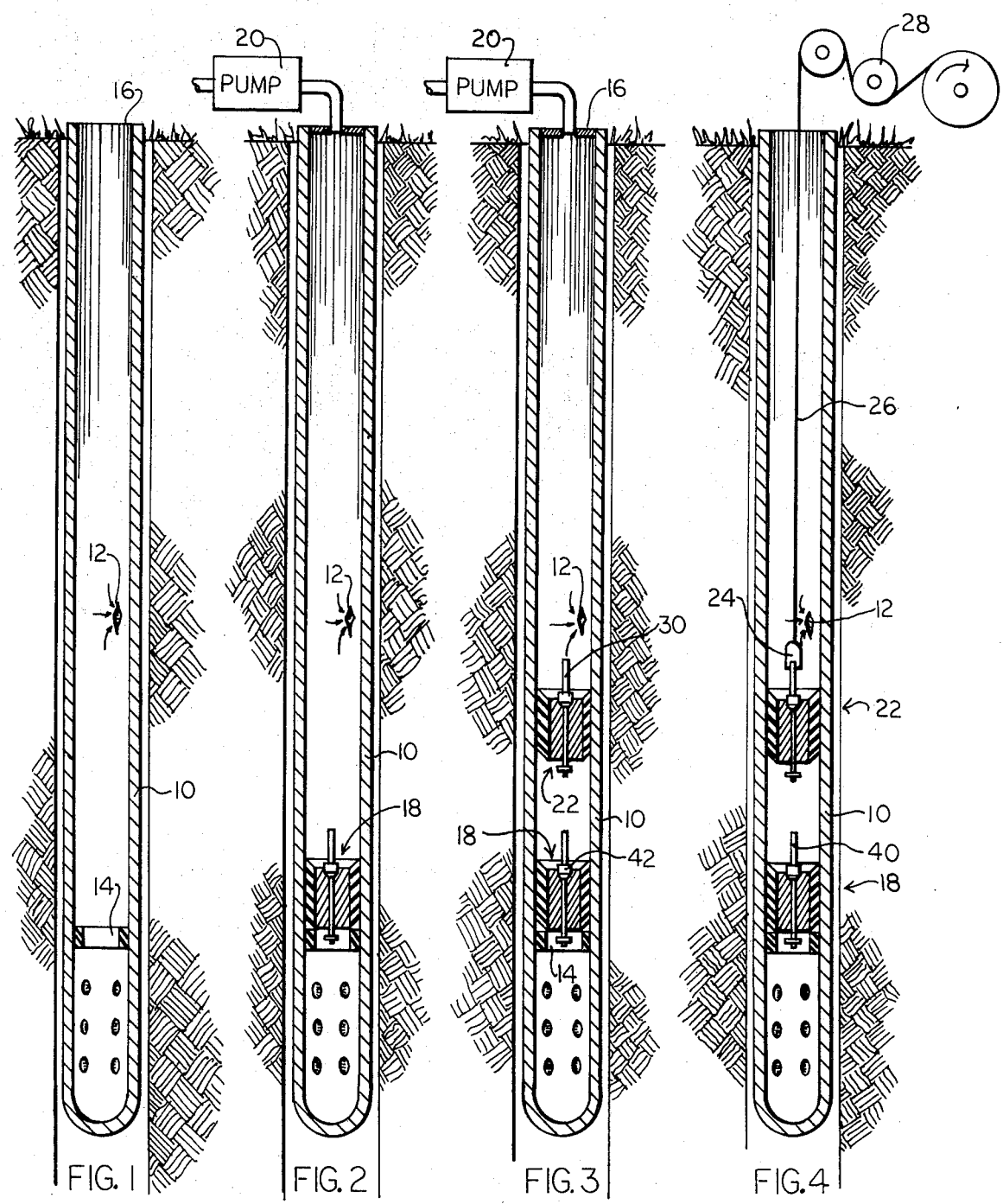

INVENTOR:
GLENN O. HUBBARD

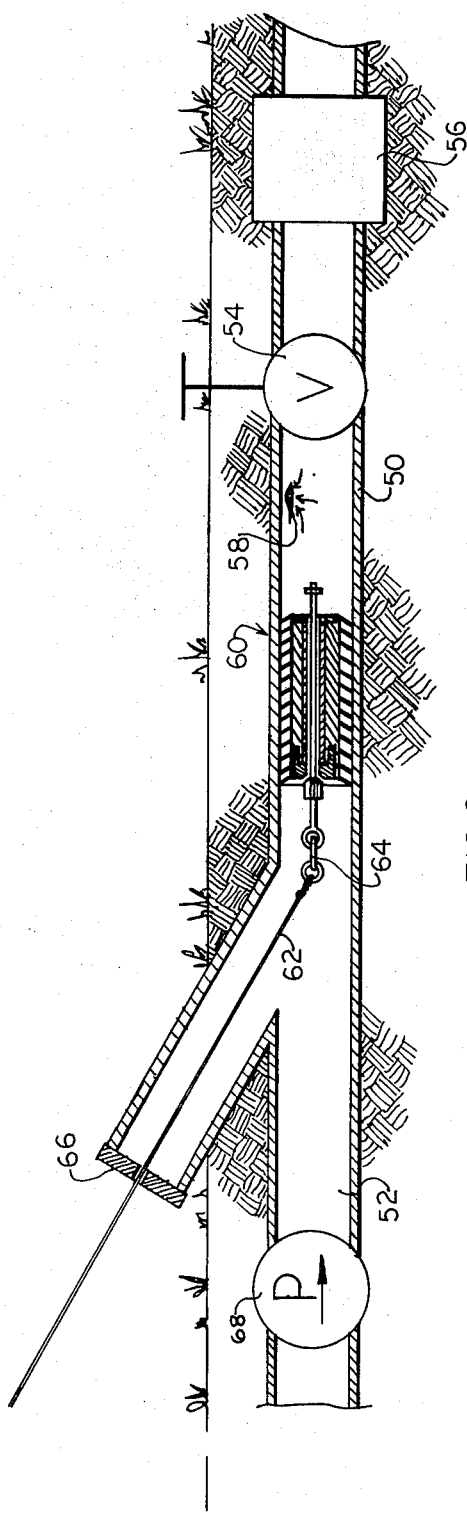

LOCATING HOLES IN TUBING

BACKGROUND OF THE INVENTION

1. Field of the Invention

This invention relates to measuring and testing of pipes using fluid under pressure to locate the position of a known leak.

2. Description of the Prior Art

Apparatus to test underground conduit such as well casing for leaks have been known to prior art, e.g., Mitchell, U.S. Pat. No. 1,572,748. However, such inventions do not show how to locate the leak once it was discovered. Also, other devices, such as Henderson, U.S. Pat. No. 1,221,733, and Hauk, U.S. Pat. No. 3,478,577, disclose means for testing segments of pipe for leaks, however, in each case the segment tested is a short segment and at the time the tester is testing, he knows what part he is testing; therefore, if there is a leak he knows the location thereof. En Dean et al., U.S. Pat. No. 2,951,362, discloses a mechanism for testing a pipe which has a recording instrument therein, which will record the time that it passes a leak; therefore, under carefully controlled conditions, the approximate location of the leak could be determined. Also, the En Dean et al. patent discloses a wheel, which runs against the inside bore of the pipe so that the approximate location of the leak can be determined.

SUMMARY OF THE INVENTION

With pipelines spanning the country, they often develop a leak and in the case of an oil pipeline, often times the oil will travel along the pipe a considerable distance before it comes to the surface; therefore, it may be known that there is a leak in the pipeline, but the exact location of the leak may be difficult to determine. Also, the leak may develop at a river crossing where downstream indications show that there is a leak, but the location of the leak is extremely difficult to determine. In oil wells, the casing or the eduction tube may have a leak. Indications of the leak are readily apparent, but the location of the leak downhole is not known.

1. New and Different Function

My invention is to locate these leaks with extreme accuracy. A segment of the conduit is separated. In the case of a well, the entire length of the conduit forms a segment. Then one end of the segment is closed. In a pipeline this would customarily be done by closing a valve. In a well, this is done by setting a closure plug against the seating nipple or other projection at the bottom of the well. Then a traveling plug is pumped into the conduit. Until the plug reaches the leak, the plug will traverse through the pipe because there is an excape of the fluid in the conduit through the leak. Once the plug passes the leak, however, the plug will move no more because of the fluid trapped between the plug and the closure. Then the distance to the traveling plug is measured by a wire line. In the case of a well, a wire line with an overshot is lowered and attached to a fishing neck on the plug. Measuring devices are well known to oil field workers and by the use of conventional equipment, the length of wire to the plug can be measured readily. Thereafter, the plug is retrieved by pulling it up with the wire line. A valve in the plug is opened so the tubing is not swabbed of the fluid contained therein as the plug is retrieved. Thereafter, the closure plug on the bottom can likewise be retrieved by a wire line and the leak repaired by conventional means, but the repair of the leak is greatly facilitated because its exact location is now known.

The same procedure can not be followed exactly with a horizontal pipeline because of the difficulty of attaching a wire line to the traveling plug in the pipe. Therefore, the preferred procedure in the case of a pipeline is to attach the wire line to the plug before the plug is pumped through the line. When the plug passes the leak, it stops. The plug could be retrieved by pulling it back with the wire line, however, in pipeline practice the more conventional practice would be to free the wire line from the plug by breaking a shear pin between the wire line and the plug. Then the valve in the end of the segment is opened and the plug is pumped through the line as is standard practice with pipeline procedures.

2. Objects of this Invention

An object of this invention is to locate the position of a leak in underground conduit.

Further objects are to achieve the above with hardware that is sturdy, compact, durable, simple, safe, lightweight, versatile, efficient and reliable, yet inexpensive and easy to manufacture, install, operate, and maintain.

Still further objects are to achieve the above with a method that is safe, rapid, versatile, efficient, and inexpensive, and does not require skilled people to install, adjust, operate, and maintain.

BRIEF DESCRIPTION OF THE DRAWING

FIG. 1 is a schematic representation of an eduction tube in an oil well having a leak to be located.

FIG. 2 is a schematic representation similar to FIG. 1 with the closure plug in place.

FIG. 3 is a schematic representation similar to FIGS. 1 and 2 with the traveling plug in place.

FIG. 4 is a view similar to FIGS. 1, 2, and 3, illustrating the traveling plug being retrieved.

FIG. 6 is a schematic representation similar to FIG. 5 of a pipeline with a traveling plug in transit.

DESCRIPTION OF THE PREFERRED EMBODIMENTS

Figure 5:
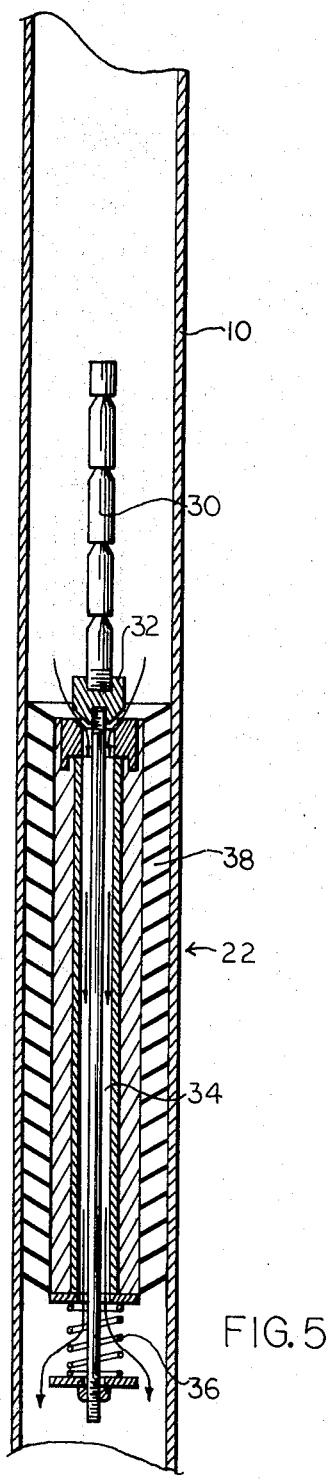
FIG. 5 is a schematic representation of a pipeline with a traveling plug in transit, with axial lengths greatly foreshortened for clarity.

The first embodiment illustrated in FIGS. 1–4 is for locating a leak in an oil well. As may be seen, some sort of tubular conduit 10 extends deep within the ground. The tubular conduit more than likely would be an eduction tube, however, it will be understood that it could be drill pipe or casing or any other kind of pipe or tubing which extends underground. Inasmuch as it is more likely to be an eduction tube of a pumping oil well, it has been illustrated as such with leak 12 in the form of a hole through the tubing. The length of tubing itself forms a single segment, and at the bottom, the conduit 10 has seating nipple 14 as is common and standard practice in the oil industry. Open end 16 forms the other end of the segment.

According to my invention, closure plug 18 is inserted into the tubing and then pump 20 is attached to the open end 16 and the plug 18 is pumped down to the seating nipple 14. This procedure, of course, closes the closable end, which is in this instance the bottom end of the segment, which is the conduit 10.

In some instances, the closure plug 18 may be dropped and no pump used, but if a pump is used, thereafter, the pump 20 is disconnected from the opening 16 and traveling plug 22 is placed in the open end 16 of the conduit 10 and the pump 20 reconnected to the conduit and fluid is pumped from behind the plug 22, forcing the traveling plug 22 down the conduit. So long as the fluid within the conduit can escape through the leak 12 ahead of the plug 22, the traveling plug 22 traverses down the conduit. However, immediately when the plug 22 passes the location of the leak 12, the plug 22 stops because of the trapped oil or water in the conduit 10 is non-compressible. Of course there is no way for the operator to known that the plug 22 has stopped, so he continues pumping until he has displaced sufficient fluid volume in the pump 20 to have pumped the plug all the way to the closable end at the seating nipple 14.

Thereafter, the pump 20 is again disconnected from the open end 16 and overshot 24 is attached to wire line 26, which is reeved around measuring device 28. The measuring device 28 is common in oil well work and is commercially available on the market; they generally consist of two pulleys, the wire line going over one and under the other so there is good frictional contact between the wire line and the pulleys; then one of the pulleys having a known diameter is connected to a counter so that the amount of wire line passing over the pulley is known. With the overshot 24 on the wire line 26, the overshot is lowered until the overshot contacts fishing neck 30 on top of the traveling plug 22. Such procedures are well known in the oil field and the operator can determine when the overshot does connect to the fishing neck 30 and at that time the measurement on the measuring device 28 is noted. This measurement is the distance from the open end 16 of the tubing 10 to the leak 12, which is the desired information. Thereafter, tension upon the line 26 will retrieve the plug 22.

The tension on the fishing neck 30 of the plug 22 will open valve 32 located in the passageway 34, which extends axially through the plug 22. (FIG. 5). Opening this passageway as the plug is being pulled out, permits the fluid to pass through the plug 22; therefore, the tubing or conduit 10 is not swabbed as the plug is retrieved. Where it not for the valve 32 opening the passageway 34 because the sides of the plug make a sealing contact with interior walls or bore of conduit 10, the pulling of the plug would cause all the fluid in the conduit to be pulled up as the plug was removed or the tubing would be swabbed. This is undesirable because of the additional weight or tension on the line 26 and, also, because there is no good disposal of the fluid at the open end 16 of the tubing.

The valve 32 is normally held in a closed position by spring 36. Construction of such plugs is well within the skill of people ordinarily acquainted with oil wells and is not described further here, except the plug does have the valve 32 actuated from tension upon the fishing neck 30, which opens the passageway 34 and that normally the spring 36 holds the valve 32 closed, thereby closing the passageway 34. The wipers or cups 38, which form the seal between the plug and the tubing, are of conventional design.

After the plug 22 is retrieved and removed from the overshot above the ground, the overshot 24 is again lowered into the well to engage upon fishing neck 40 of the closure plug 18. The closure plug 18 can be of identical construction as the traveling plug 22; therefore, the tension upon the fishing neck 40 opens valve 42 in a passageway so that the tubing is not swabbed as the closure plug 18 is retrieved. Likewise, a spring (not shown) normally holds valve 42 closed. Thus I provide a simple structure and method to locate precisely where tubing, drill pipe, drill stem, casing, or any other of the tubular conduits in wells are leaking.

Another embodiment of my invention is illustrated in FIG. 6. In this particular instance, the underground conduit is illustrated as a pipeline. Such conduits extend for thousands of miles, but in this particular instance the invention is concerned only with segment 50 between pump or open end 52, and the closable end being represented by gate valve 54. As is standard practice with underground pipelines, there is means, represented at 56, for removing "pigs" or plugs, which are conventionally put in the line to separate different fluids which may be pumped therethrough.

To find the location of leak 58, first the line is filled with some non-compressible fluid and the gate valve 54 is closed. Then traveling plug 60 with wire line 62 attached by means of shear pin 64 is introduced into the pipeline. Conventionally, packing or wiper 66 extends around the wire line to form a seal therearound. The plug 60 is pumped by pump 68 along the pipeline. Until it reaches leak 58, the plug will continue down the pipeline because of the displacement and loss of the fluid between the plug 60 and the gate valve 54.

However, as soon as the plug 60 passes the leak 58, it will move no more because of the non-compressible fluid trapped between the plug 60 and gate valve 64 at which time the plug will stop. This will be immediately evident to the operator because the wire line 62 will stop being fed into the packing 66. At that time, a measurement may be made upon the wire line 62 or measurement read in a similar manner as the previous embodiment or the wire line can be marked at that time.

The shear pin 64 is broken by a sudden pull or jerk upon the wire line 62, and the wire line retrieved to the open end 52 of the segment 50 of the pipeline being tested. Then the valve 54 is opened and the traveling plug pumped on to the removal point 56 where it is removed as plugs are conventionally removed.

Another means of operation is that after the location has been found, the plug 60 is retrieved by pulling the wire line and the plug, both, back to the open end 52. When this procedure is followed, the plug is provided with an axial passageway and spring biased valve closing same so that the segment 50 would not be swabbed as the plug was being retrieved.

Another mode of operation is to cut the wire line 62 at the packing 66 at the time the plug 60 stops. Then the valve 54 is opened and the plug with the wire line attached is pumped on to the removal point 56 and the wire line removed along with the plug.

In any event, by having the wire line attached to the plug and the plug stopped at the leak 58, an exact measurement by the wire line is obtained to find the exact distance from the open end 52 to the leak 58 so that the exact position of the leak is determined.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

I claim as my invention:

1. In a long tubular conduit extending underground having
   a. at least one segment with
      i. an open end, and
      ii. a closable end, and
   b. a leak in the segment,
   c. the improved structure for locating the position of the leak in the segment comprising:
   d. closure means for closing the closable end thereat,
   e. a traveling plug introduced in the segment from the open end thereof,
   f. pump means for pumping fluid into the conduit at the open end,
   g. a line extending in the conduit from the open end to the plug,
   h. a fishing neck on the traveling plug,
   j. an axial fluid passageway through the traveling plug, and
   k. valve means attached to the fishing neck for opening the passageway when tension is applied to the fishing neck so that the conduit is not swabbed as the plug is pulled.

2. The invention as defined in claim 1 with the additional limitations of
   m. a seating nipple at said closable end of the segment and
   n. said closure means being a closure plug which is pumped into the conduit against the seating nipple.

3. The invention as defined in claim 1 with the additional limitations of
   h. measuring means connected to the line outside the conduit for measuring the length of the line in the conduit.

4. The invention as defined in claim 3 with the additional limitation of
   n. a seating nipple at said closable end of the segment and
   o. said closure means being a closure plug which is pumped into the conduit against the seating nipple.

5. The method of locating the position of a leak in a long tubular conduit comprising the steps of:
   a. filling a segment of the conduit with non-compressible fluid,
   b. closing the end of the segment of the tubular conduit,
   c. pumping a traveling plug into an open end of the conduit by
      i. introducing the plug into the segment, and
      ii. pumping fluid behind the plug,
   d. continuing to pump fluid behind the plug until the plug could reach the end of the segment, and then
   e. retrieving the traveling plug by
   f. pulling it back to the open end of the conduit by a line attached to the plug, and
   g. measuring the length of line extended, thus
   h. measuring the distance of the plug from the end of the segment where the plug was introduced;
   j. opening a valve in the plug responsive to pulling the plug, thus
   k. preventing the plug from swabbing the conduit as it is removed.

6. The invention as defined in claim 5 with the additional limitations of
   j. attaching the line to plug after the pumping operation is completed.

* * * * *